E. M. STERNBERG.
SUSPENSION FRAME FOR TRANSMISSION GEAR.
APPLICATION FILED DEC. 17, 1910.
1,027,447.
Patented May 28, 1912.
2 SHEETS—SHEET 1.
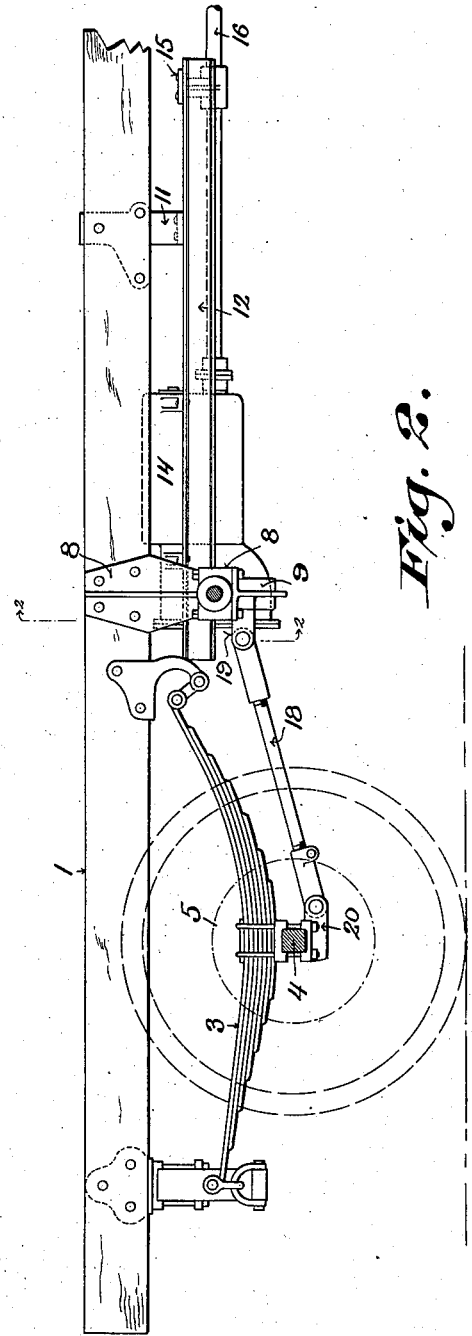
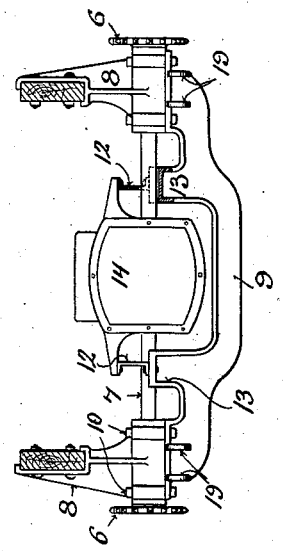

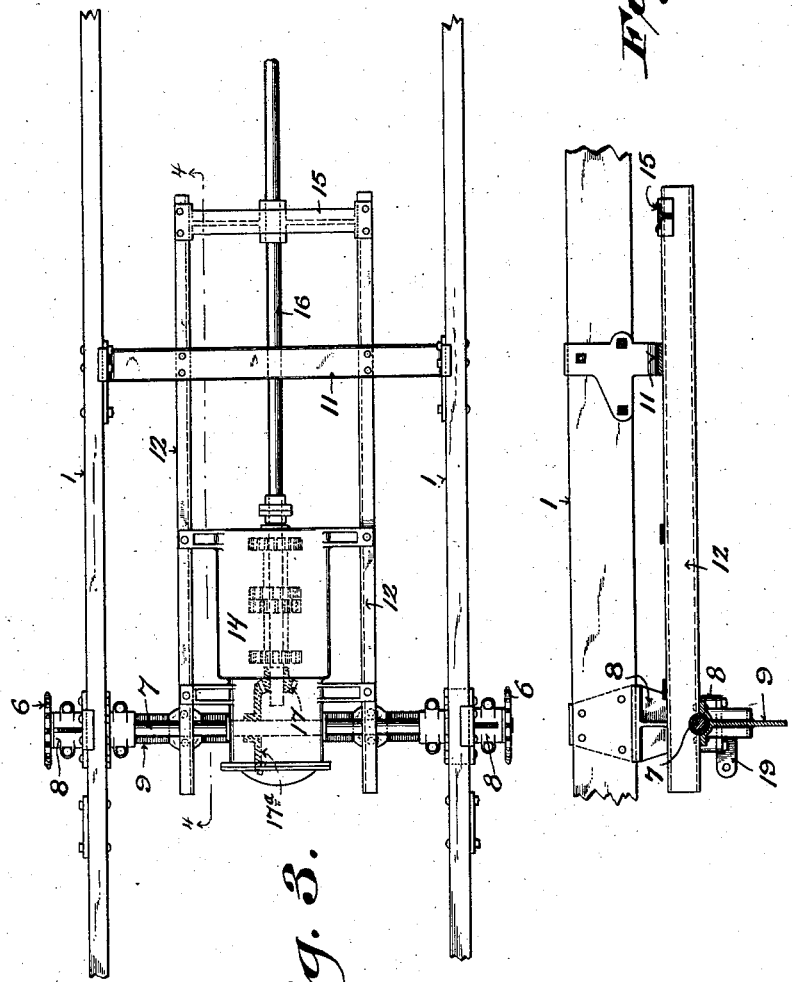

UNITED STATES PATENT OFFICE.

ERNST M. STERNBERG, OF MILWAUKEE, WISCONSIN.

SUSPENSION-FRAME FOR TRANSMISSION-GEAR.

1,027,447.  Specification of Letters Patent.  Patented May 28, 1912.

Application filed December 17, 1910. Serial No. 597,895.

*To all whom it may concern:*

Be it known that I, ERNST M. STERNBERG, a citizen of the United States, and resident of Milwaukee, in the county of Milwaukee and State of Wisconsin, have invented certain new and useful Improvements in Suspension-Frames for Transmission-Gear; and I do hereby declare that the following is a full, clear, and exact description thereof.

The object of my invention is to provide a simple, economical, rigid and effective supporting frame for the transmission gear of motor propelled vehicles, the construction and arrangement of the frame being such that alinement of the drive and driven shafts of the transmission gear is maintained regardless of yield or flex of the main truck frame of the vehicle to which the transmission gear frame is attached.

With the above object in view the invention consists in certain peculiarities of construction and combination of parts as fully set forth hereinafter with reference to the accompanying drawings and subsequently claimed.

In the drawings Figure 1 represents a side elevation of a portion of a truck frame having secured thereto a transmission gear frame embodying the features of my invention; Fig. 2, a cross-section of the same as indicated by line 2—2 of Fig. 1; Fig. 3, a plan view of the truck frame, and Fig. 4, a detail longitudinal sectional view as indicated by line 4—4 of Fig. 3.

Referring by characters to the drawings, 1, 1, represent the longitudinal side bars of a truck frame provided with standard hangers for the suspension of the usual springs 3, to which springs is secured the rear axle 4 of the vehicle, and, as shown in dotted lines, the axle carries the usual loosely mounted traction wheels together with sprocket-wheels 5, also indicated in dotted lines. The sprocket-wheels 5 are in chain belt connection with smaller sprocket-wheels 6, which are secured to a transversely disposed driven shaft 7. The driven shaft 7 is journaled in hangers 8 that are secured to the side bars 1 of the truck frame, which hangers are rigidly connected by a transversely disposed metallic bridge 9, the hangers and bridge being secured together through means of bolts 10 that are fitted in ear extensions of the hangers and pass through webs of the bridge, the said bridge being located just forward of the rear truck axle. Disposed at a predetermined distance forward of the bridge is a truss 11, which truss is also secured to the truck side bars and extends crosswise thereof. The bridge and truss form supports for longitudinally disposed parallel I-beams 12, the front ends of the beams being bolted or otherwise secured to the lower face of the truss, while the rear ends of the beams rest upon upwardly extending feet 13 of the bridge, to which feet they are secured by bolts or rivets.

As best shown in Figs. 2 and 3, the I-beams serve as supports for a gear-case 14, which gear-case is provided with feet that rest upon and are secured to the beams, it being understood that any type of transmission gear having the desired number of speeds is fitted within the same, the gearing being indicated by dotted lines in Fig. 3. The forward ends of the beams 12 are connected by a cross-girder 15 having a centrally disposed bearing for a main drive-shaft 16, which drive shaft extends longitudinally rearward into the gear case and in this instance carries a beveled pinion 17, which pinion is adapted to mesh with a beveled gear-wheel 17$^a$ carried by the driven shaft 7, it being understood that the driven shaft 7 passes directly through said gear casing and is upon the same horizontal plane as the drive shaft and disposed at a right angle thereto.

From the foregoing description it will thus be understood that the drive and driven shafts are journaled in a rigid metallic sub-frame, whereby loss of power is reduced to a minimum as well as wear upon the journals. The sub-frame just described is also tied to the rear truck axle 4 through rods 18, which rods are fulcrumed in ears 19 that extend from the bridge 9 and corresponding ears of clips 20 that are secured to said rear axle. By this tie-rod connection the distance between the driven shaft 7 and rear axle is fixedly maintained, whereby undue slack or tautness of the drive chain connections between the sprocket-wheels 5 and sprocket-wheels 6 of said drive shaft is eliminated. Thus it will be also seen that the rigid metallic sub-frame which is suspended from the main truck frame has a positive tie connection with the rear axle whereby all of the transmission gearing is maintained in a relative rigid manner with relation to the main drive shaft.

I claim:

1. In a self propelled vehicle having a truck frame comprising longitudinal side bars; the combination of depending hangers rigidly secured to the side bars, a transverse bridge rigidly secured to the hangers, a transverse truss rigidly secured to the side bars positioned forwardly of and approximately parallel to the bridge, longitudinal beams connecting the bridge and truss, a gear casing secured to the beams adjacent to one end thereof, a cross-girder connecting the opposite ends of the beams, a longitudinal drive shaft journaled in the cross-girder and gear casing, and a driven shaft journaled in the hangers above the bridge.

2. In a self propelled vehicle having a rear axle for the support of traction-wheels and a main truck frame comprising longitudinally disposed bars; the combination of a sub-frame comprising a transversely disposed bridge and a transversely disposed truss secured to the frame bars, longitudinally disposed parallel beams connecting said bridge and truss, a gear casing secured to the beams adjacent to one end thereof, a cross-girder connecting the opposite ends of said beams, a longitudinally disposed drive shaft journaled in the cross-girder and gear casing, a transverse driven shaft journaled upon the bridge, the driven shaft being arranged to have gear connection with said rear axle, traction-wheels and a tie-rod pivoted to the rear axle and bridge.

3. In a self propelled vehicle having a main truck frame comprising longitudinally disposed bars; the combination of hangers secured to the side bars, a bridge secured to the hangers, a truss secured to said side bars, parallel beams secured to the lower face of the truss and upper face of the bridge, a gear case secured to the upper faces of the beams, a cross-girder connected to the beams adjacent to one end, a drive shaft journaled in the cross-girder and gear-casing, and a driven shaft journaled in the hangers, the drive and driven shafts being upon the same horizontal plane.

In testimony that I claim the foregoing I have hereunto set my hand at Milwaukee in the county of Milwaukee and State of Wisconsin in the presence of two witnesses.

ERNST M. STERNBERG.

Witnesses:
   MAY DOWNEY,
   GEO. A. YOUNG.

---

Copies of this patent may be obtained for five cents each, by addressing the "Commissioner of Patents, Washington, D. C."